United States Patent
Appt et al.

(10) Patent No.: US 7,109,855 B2
(45) Date of Patent: Sep. 19, 2006

(54) METHOD AND APPARATUS FOR MONITORING PARAMETERS OF AN EASILY IGNITED GAS

(75) Inventors: Ulrich Appt, Stuttgart (DE); Dirk Schroeter, Winnenden (DE)

(73) Assignee: DaimlerChrysler AG, Stuttgart (DE)

( * ) Notice: Subject to any disclaimer, the term of this patent is extended or adjusted under 35 U.S.C. 154(b) by 501 days.

(21) Appl. No.: 10/406,001

(22) Filed: Apr. 3, 2003

(65) Prior Publication Data

US 2003/0215681 A1 Nov. 20, 2003

(30) Foreign Application Priority Data

Apr. 4, 2002 (DE) ................. 102 14 868

(51) Int. Cl.
*B60Q 1/00* (2006.01)

(52) U.S. Cl. .................. 340/438; 340/309.16; 73/1.02

(58) Field of Classification Search ................ 340/438, 340/552, 619, 309.16; 702/23, 31; 180/65.8; 73/1.02, 40.7; 700/91, 108, 266, 274
See application file for complete search history.

(56) References Cited

U.S. PATENT DOCUMENTS 5,132,663 A * 7/1992 Strobl et al. ................ 340/438
6,200,443 B1 * 3/2001 Shen et al. .................. 204/401
6,204,769 B1 * 3/2001 Arai et al. ................... 340/632
6,569,552 B1 * 5/2003 Kato et al. ..................... 429/17
2002/0011410 A1 * 1/2002 Inoue et al. ................. 204/426

FOREIGN PATENT DOCUMENTS

| DE | 31 23 403 A1 | 6/1981 |
| DE | 35 43 331 C2 | 12/1985 |
| DE | 3907049 | 9/1990 |
| DE | 199 59 699 C1 | 12/1999 |
| EP | 0751488 | 1/1997 |
| JP | 2-47556 | 3/1990 |
| JP | 04-361148 | 12/1992 |
| JP | 06-223850 | 8/1994 |
| JP | 2001-344674 | 12/2001 |

* cited by examiner

*Primary Examiner*—Phung T. Nguyen
(74) *Attorney, Agent, or Firm*—Crowell & Moring LLP

(57) ABSTRACT

In a method and apparatus for monitoring a parameter, such as a concentration level, of an easily ignited gas, such as hydrogen, includes a wake-up device that is connected to a current/voltage supply, and can switch the monitoring unit from a state of rest into an active state after an adjustable time interval. The device according to the invention can be used in a fuel cell system or in a vehicle. Furthermore, the invention relates to a method for monitoring the concentration of an easily ignited gas.

16 Claims, 2 Drawing Sheets

METHOD AND APPARATUS FOR MONITORING PARAMETERS OF AN EASILY IGNITED GAS

BACKGROUND AND SUMMARY OF THE INVENTION

This application claims the priority of German patent document 102 14 868.6, filed Apr. 4, 2002, the disclosure of which is expressly incorporated by reference herein.

The invention relates to a method and apparatus for monitoring parameters of an easily ignited gas.

Electronic units, typically integrated in controllers, are used increasingly for open-loop control, closed-loop control and/or monitoring of fixed and mobile devices and systems. During monitoring, relevant status variables of a system are usually measured or observed, and evaluated by means of diagnostic algorithms to predict failures, so that corresponding measures for eliminating or minimizing their effects can be initiated. As a result, environmental risks can be alleviated.

In fuel cell systems used, for example, in vehicles, electrical energy is generated from gases which are rich in hydrogen and oxygen. Because hydrogen is an explosive gas, reliable monitoring of the concentration of the hydrogen is essential. Oxygen can be ignited, for example, at concentrations starting from approximately 4%.

German patent document DE 199 59 699 C1 discloses a device for monitoring a gas which is rich in hydrogen in a vehicle with a fuel cell system. The device has an evaluation unit to which hydrogen-sensitive sensors are connected. The latter are arranged in two ducts and are connected, at least partially, in the form of a cascade, providing a device which is robust with respect to fluctuations in temperature.

In order to ensure the operational capability and the safety of a fuel cell system (or other systems in which a gas that is rich in hydrogen or other easily ignited materials are used, such as internal combustion engines to which hydrogen is fed as a fuel), it is necessary to monitor such system for an acceptable concentration of hydrogen (or other easily ignited gas), both in a state of rest and while the entire system is operating. Such monitor must be performed as long as hydrogen (or other easily ignited gas) is present in the system, in particular in a store or tank. As used herein, easily ignited gases include combustible, explosive or highly inflammable materials or mixtures of such materials, such as hydrogen.

One object of the invention is to provide a device for monitoring concentration of an easily ignited gas during periods when the system is at rest, with a low expenditure of electrical energy.

Another object of the invention is to provide a fuel cell system and a means of transportation in which an easily ignited gas can be monitored with a low expenditure of electrical energy.

Still another object of the invention is to provide a method for monitoring an easily ignited gas, with a low demand for electrical energy.

These and other objects and advantages are achieved by the method and apparatus according to the invention in which the hydrogen concentration is monitored during a state of rest, in such a way that a current/voltage source, such an energy store, provided for the entire system is only slightly loaded; and as a result it is prevented from being stressed. Entire systems include, for example, a fuel cell system or a means of transportation, such as a motor vehicle.

The invention can advantageously be used in a motor vehicle to detect gas leakages, due to the low energy demand of a wake-up device for the monitoring unit, even when the motor vehicle is not in use, (for example, when it is parked), because the low energy demand of the wake-up device can be covered by a vehicle battery. The safety of persons, vehicle and their surroundings is therefore ensured even when the motor vehicle is in a stationary state or parked.

Other objects, advantages and novel features of the present invention will become apparent from the following detailed description of the invention when considered in conjunction with the accompanying drawings.

DETAILED DESCRIPTION OF THE DRAWINGS

Figure 1:
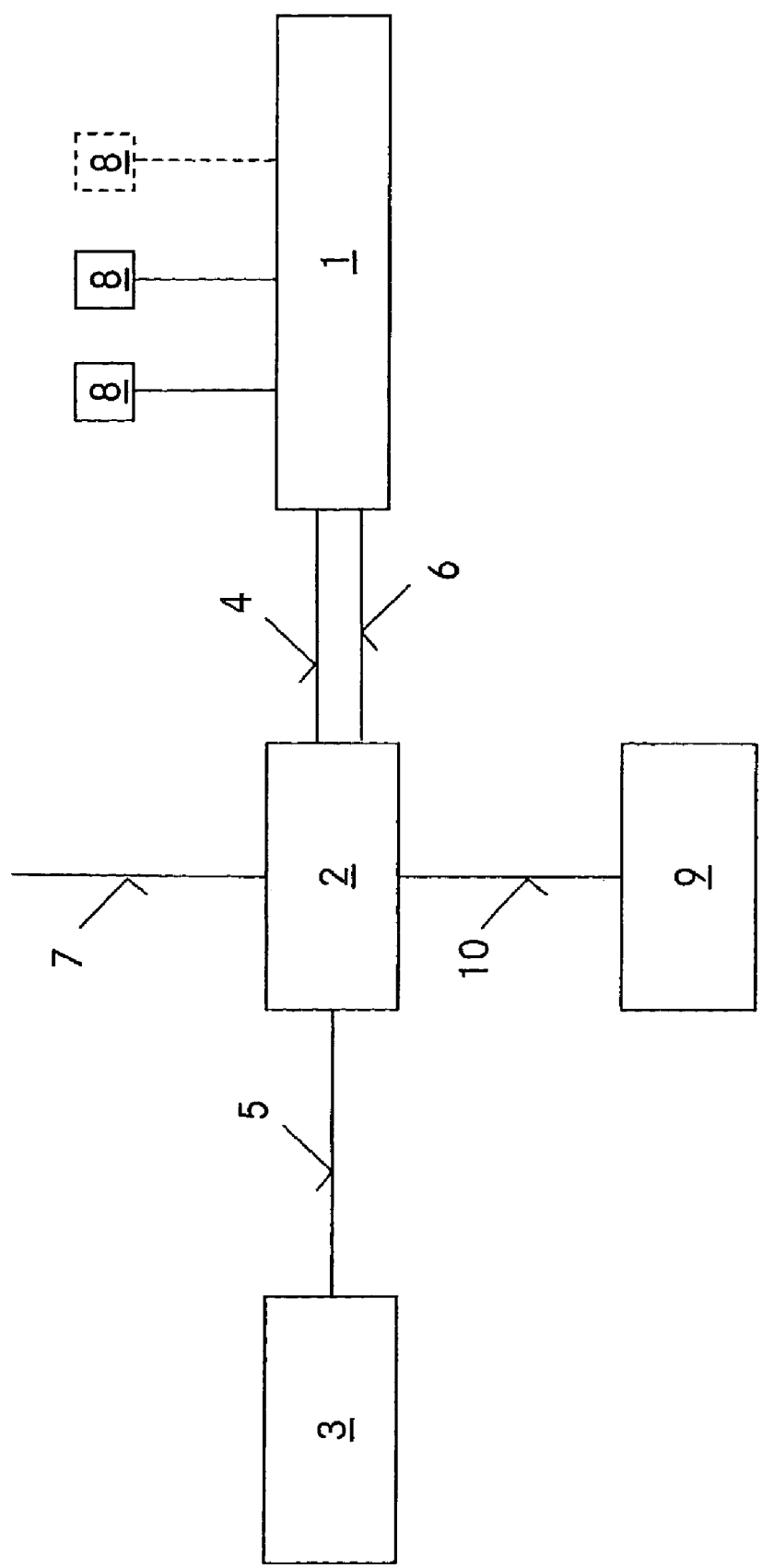
FIG. 1 shows a schematic view of a device according to the invention.

A device according to the invention is illustrated schematically in FIG. 1. A monitoring unit 1 for monitoring an easily ignited gas is connected to a wake-up device 2 via a signal line 4 and a power supply line 6. (The easily ignited gas is preferably a gas which is rich in hydrogen.) The signal line 4 and the power supply line 6 can also be embodied as a single line. The wake-up device 2 is connected via a power supply line 5 to a power/voltage supply 3, is preferably an energy store, such as a battery and/or a SuperCap. An energy transducer, for example a solar cell, may also be used as the power/voltage supply 3. The wake-up device 2 has a low power drain, and can thus be continuously connected to a battery, for example, in a vehicle.

The wake-up device 2 may be integrated in a controller (preferably a master controller), and is preferably equipped with a timer. The monitoring unit 1 may be a stand-alone unit (for example a controller), or a component of a superordinate unit, in particular a controller, which has additional functionalities.

The wake-up device 2 is connected via a line 7 to the entire system (not illustrated), such as a fuel cell system, transportation means or a mobile device, and preferably to a superordinate control unit (not illustrated), such as a vehicle controller.

One or more sensors 8 (of which three are shown solely for purposes of illustration) for measuring the easily ignited gas, or the concentration thereof, are also connected to the monitoring unit 1 via lines. The sensors 8, which are preferably used for measuring hydrogen or hydrogen concentrations, are based on different detection principles (e.g., detection by means of an electrochemical cell, infrared absorption, measurement of electrical conductivity at semiconductor detectors, catalytic combustion and measurement of thermal conductivity).

The monitoring unit 1 preferably has an evaluation unit (not illustrated) which, if appropriate, processes (for example, filters), and evaluates the signals generated or measured by the sensors 8. Alternatively, the values which are determined by the sensors 8 may also be transmitted by the monitoring unit 1 to an evaluation unit (not illustrated). If an unacceptable concentration of the easily ignited gas is detected, an alarm state is generated.

When the entire system enters a state of rest (for example, when a motor vehicle is parked, and/or when material is not being converted), the wake-up device 2 generates a signal for waking up or activating the monitoring unit 1, preferably by means of a signal generator (not illustrated) after waiting for a specific time interval. For this purpose, the wake-up device 2 comprises appropriate timers, counters, stores and/or switching elements. The wake-up signal may be an optical, electrical or an electromagnetic signal and is preferably a pulse. The type and shape of the signal may depend on the operating state of the entire system, such as the fuel cell system or the vehicle. The latter includes, for example, start/stop operating mode in congestion or at traffic lights or a longer stationary state, for example when the vehicle is parked. The advantages of optical signal transmission are explosion-proof transmission and a high degree of immunity to electromagnetic radiation.

Figure 2:
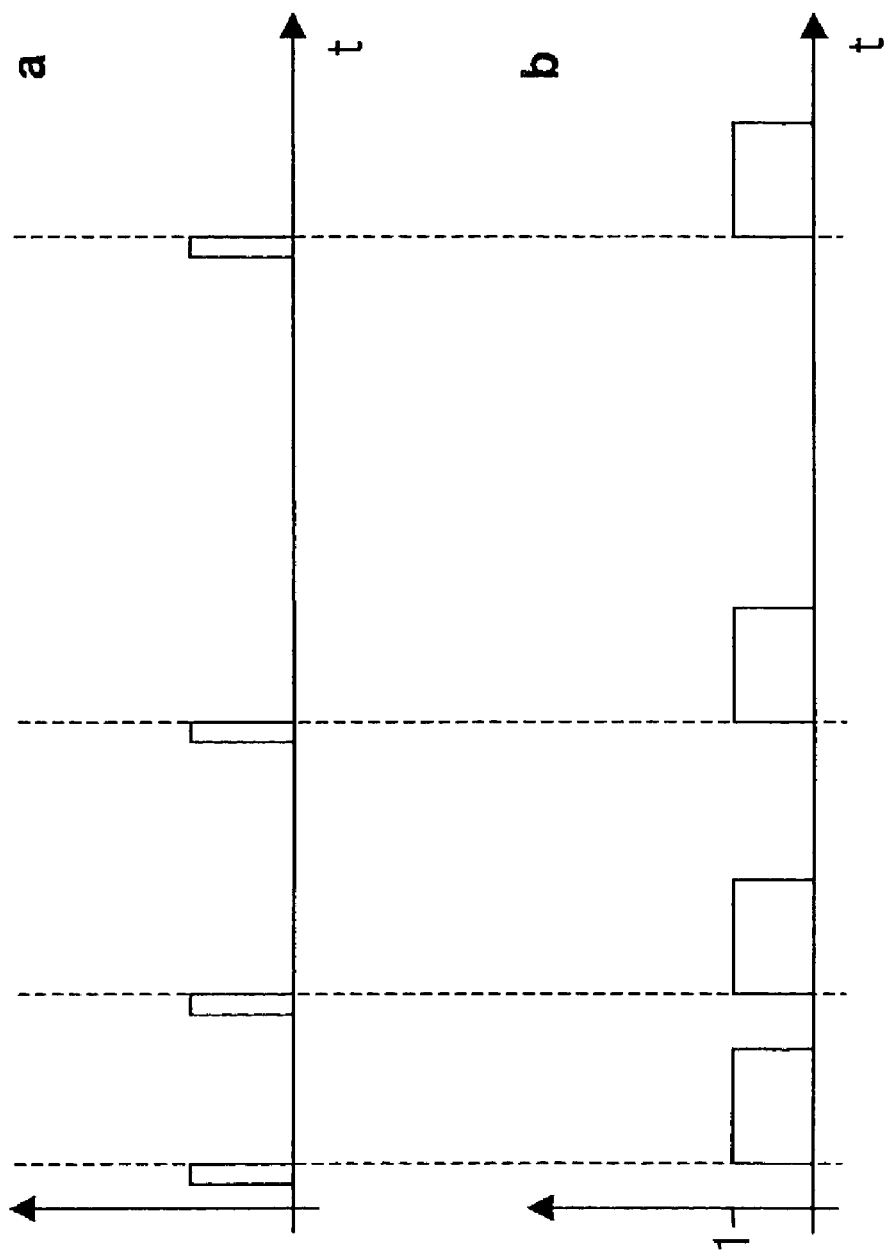
FIG. 2 is a graphic depiction of wake-up signals (diagram a) and states of a monitoring unit in a device according to the invention (diagram b) over time.

FIG. 2 illustrates wake-up signals in diagram a, and the associated states of the monitoring unit 1 in diagram b, plotted against time t as unbroken lines in the coordinate systems. The wake-up signals have, over time, the shape of pulses which are represented as finite for reasons of feasibility. The duration of a pulse is preferably between a fraction of a second and several seconds, and has the purpose of switching the power supply in the monitoring unit 1. The wake-up device switches the monitoring unit 1, after a specific time interval T, from a state of rest into an active state for a specific time period by means of the wake-up signal. An active state of the monitoring unit 1 is represented in diagram b by means of the value 1. The duration of the active state may be application-dependent, taking into account the type of power/voltage supply of the monitoring unit 1, and can be set as a function of the safety needs. Preferably, the alert time or the active state of the monitoring unit 1 is in the region of up to one minute, or longer in the case of complex monitoring applications. As indicated by the dashed lines in FIG. 2, switching over from the state of rest into the active state takes place, for example, with the falling edge of the wake-up signal. The switching over can also take place at any other desired time, for example with the rising edge of the wake-up signal.

After the system enters a standing or quiescent phase the lengths of the time intervals T after which the monitoring unit is switched from a state of rest into an active state may depend on the operating state of the entire system (for example, a fuel cell system or of a vehicle). If a vehicle is not moved for a relatively long time period (for example, when it is parked), a longer time interval may be selected than, for example, just after the vehicle is switched off (corresponds to the state ignition "OFF"), in the start/stop operating mode during congestion or in a normal traffic situation in town traffic. The time intervals after which the monitoring unit is changed from the state of rest into the active state (or the time interval between such active states) are preferably shorter after the end of operation of the entire system (for example, in the range of minutes), in order to protect, for example, against hazards due to cooling/heating processes (propagation of heat) and/or drying. On the other hand such time intervals preferably become longer as the standing time or quiescent phase of the entire system continues (for example in the range of hours).

When an increase in concentration of the easily ignited gas is detected, the duration of the time intervals after which the monitoring unit is changed from the state of rest into the active state can be shortened in order to increase the resolution of the monitoring. That is, when such concentration rises, the time interval can be shortened, and when it drops the duration of the time interval can be correspondingly increased. The monitoring period can be adapted by the wake-up device 2 after communication with the monitoring unit 1, for example via the signal line 4, or a CAN bus system, or the monitoring unit 1 itself. While the time interval is being adapted, incoming wake-up signals from the monitoring unit 1 are preferably ignored.

The active monitoring unit 1 activates the sensors 8 and evaluates their results. If an unacceptable concentration of an easily ignited gas is detected, an alarm state is generated, preferably by the monitoring unit 1. The alarm state can also be generated by a superordinate controller to which the monitoring unit 1 transmits a corresponding signal, corresponding to the alarm state, for example via a signal line and/or a bus system. After the activation, the monitoring unit 1 changes back, preferably automatically or independently, into the state of rest i.e., deactivates after expiration of a preset time. The deactivation can, however, also be carried out by means of a further signal of the wake-up device or a superordinate control device such as a master controller. This further signal and/or the wake-up signal can be fed to the monitoring unit 1 via the signal line 4, which may be part of a bus system (preferably a CAN bus system). When the entire system is active (for example a fuel cell system which is converting material or a vehicle with an internal combustion engine that is running), the monitoring unit is preferably also in the active state and continuous or quasi-continuous monitoring takes place.

In the alarm state, it is possible to indicate to the user or driver, for example by means of corresponding lamps and/or sound/voice outputs, that an unacceptable gas concentration level exists in the entire system or in the vehicle. In the alarm state, one or more ejection capsules for drivers and other persons in the vehicle may also be used.

The monitoring unit 1 is preferably supplied with electrical voltage or electrical power by means of the wake-up device 2 via the line 6, without the entire system, for example a fuel cell system, having to be active, or a vehicle having to be activated by means of the drive switch or the ignition. For this purpose, the wake-up device 2 preferably has a switch (not illustrated), for example an electromagnetic relay, via which the monitoring unit 1 or the line 6 is connected to the power/voltage supply 3 or to the line 5 when the switch is closed. If a wake-up signal is generated by the wake-up device 2, the switch is closed. If the switch is embodied as an electromagnetic relay, an exciter signal for the relay can preferably also be generated in addition to the wake-up signal by means of a signal generator.

Wake-up devices of the type described above are already known, for example from German patent documents DE 35 43 331 C and DE 35 43 331 C2, which describe a pressure-medium-activated brake system for motor vehicles having a controller wake-up device that is suitable for use in the device according to the invention.

The monitoring unit 1 can also be supplied with electrical power or electrical voltage directly from a vehicle's on-board electrical system which preferably has an energy store and/or an energy transducer, for example a solar cell unit.

Of course, apart from the wake-up device 2, it is also possible to provide further actuation units in an entire system (for example a fuel cell system or a motor vehicle), which can switch the monitoring unit 1 from a state of rest into an active state, and optionally back into the state of rest.

In a preferred embodiment, the wake-up device 2 may also be connected to a store or tank 9 for an easily ignited gas (in particular hydrogen or a gas which is rich in hydrogen), via a signal line 10 which may be part of a bus system, such as a CAN bus system. The signal line 10 is preferably connected to means or sensors for determining the filling level of the store 9. The filling level measurement can be carried out for example by means of a pressure and differential pressure measuring device, by a PTC thermistor or by measuring the capacitance. The current filling level of the store 9 is then determined at the same time as the switching over of the monitoring unit 1 from the state of rest into the active state. Alternatively, the filling-level can be determined by another actuation unit, such as an additional controller and/or superordinate controller, such as a master controller. The parallel determination of unacceptable concentrations of the easily ignited gas and the current filling level of the store 9 enables a possible leakage of the store 9 to be detected.

An alarm state is preferably generated only if easily ignited gas is present in the store 9, as otherwise there is no risk to the environment.

In a further preferred embodiment, the monitoring unit 1 has further functionalities in addition to the monitoring of easily ignited gas. For example, the monitoring unit 1 can be used for sensing further, preferably critical, status variables or measurement variables. The monitoring unit 1 can thus cover, for example, the functions of the immobilizer and/or of the coolant temperature and/or fulfil the locking function in a motor vehicle and preferably be integrated in a combined instrument for this purpose. In these cases, preferably only that part of the monitoring unit 1 is switched by the wake-up device 2 from the state of rest into the active state, which has the primary function of monitoring the concentration of the easily ignited gas.

In still another preferred embodiment, the wake-up device 2 has a diagnostic function with which it can monitor the operational capability of the monitoring unit 1 and/or of the sensors 8 in the active state, and a fault signal or a fault state is preferably generated when the mode of operation of the monitoring unit 1 and/or of the sensors 8 is faulty.

The device according to the invention can be used to monitor an easily ignited gas in, or in the surroundings of, a fuel cell system, an internal combustion engine, a gas store for liquid and/or compressed gases (for example a cryotank), a hybrid store and/or similar applications or entire systems. With respect to internal combustion engines, in particular a gas which is rich in hydrogen can be used as the fuel and/or can be fed to a catalytic reactor connected downstream of the internal combustion engine for purifying the waste gas. The gas which is rich in hydrogen may be provided in a tank and/or may be acquired, preferably on-board, from methanol, diesel, petrol, natural gas and/or other hydrocarbons by means of a reformer and/or partial oxidation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a device for monitoring at least one parameter of an easily ignited fuel gas therein, said device including:
    a monitoring unit for monitoring said at least one parameter; and
    a wake-up device that is connected to a current/voltage supply and to the monitoring unit;
    wherein the wake-up device switches the monitoring unit from a state of rest to an active state after expiration of a specific time interval; and
    wherein length of the time interval is dependent on an operating state of the vehicle.

2. The device according to claim 1, wherein the monitoring unit is connected to sensors for measuring the easily ignited gas or a concentration of the easily ignited gas.

3. The device according to claim 2, wherein the monitoring unit has an evaluation unit which evaluates the signals generated by the sensors.

4. The device according to claim 1, wherein the easily ignited gas is rich in hydrogen.

5. The device according to claim 1, wherein the current/voltage supply comprises an energy store.

6. The device according to claim 1, wherein the wake-up device generates one of an optical signal, an electrical signal and an electromagnetic signal for activating the monitoring unit.

7. The device according to claim 1, wherein the wake-up device comprises a diagnostic function for diagnosing the monitoring unit and/or the sensors.

8. The device according to claim 1, wherein the wake-up device is integrated in a controller.

9. The method according to claim 1, wherein the length of the time intervals is set as a function of a determined concentration of the easily ignited gas.

10. The method according to claim 1, wherein an alarm state is generated if unacceptable concentrations of the easily ignited gas are detected.

11. The method according to claim 1, wherein after each time interval a filling state of a store for the easily ignited gas is determined.

12. The method according to claim 11, wherein an alarm state is generated when an unacceptable filling state of the store is detected.

13. The method according to claim 11, wherein an alarm state is generated if unacceptable concentrations of the easily ignited gas are detected, and the store for the easily ignited gas contains easily ignited gas.

14. The method according to claim 1, wherein said time interval is adjustable as a function of measured values of said at least one parameter.

15. A vehicle having a device for monitoring at least one parameter of a gas that is used in said vehicle, said device comprising:
    a monitoring unit for monitoring said at least one parameter;
    a wake-up device that is connected to a power supply and to the monitoring unit; and
    means for causing said wake-up device to activate said monitoring unit intermittently at variable time intervals, and for varying said time intervals as a function of an operating state of said vehicle.

16. A method of operating a vehicle having a device for monitoring at least one parameter of a fuel gas, said device having a monitoring unit for monitoring said at least one parameter in said vehicle and a wake-up device that is connected to a power supply and to the monitoring unit, said method comprising:
    said wake-up device intermittently activating said monitoring unit at variable time intervals; and
    said wake-up device varying a length of said time intervals as a function of an operating state of said vehicle.

* * * * *